United States Patent Office 3,259,481
Patented July 5, 1966

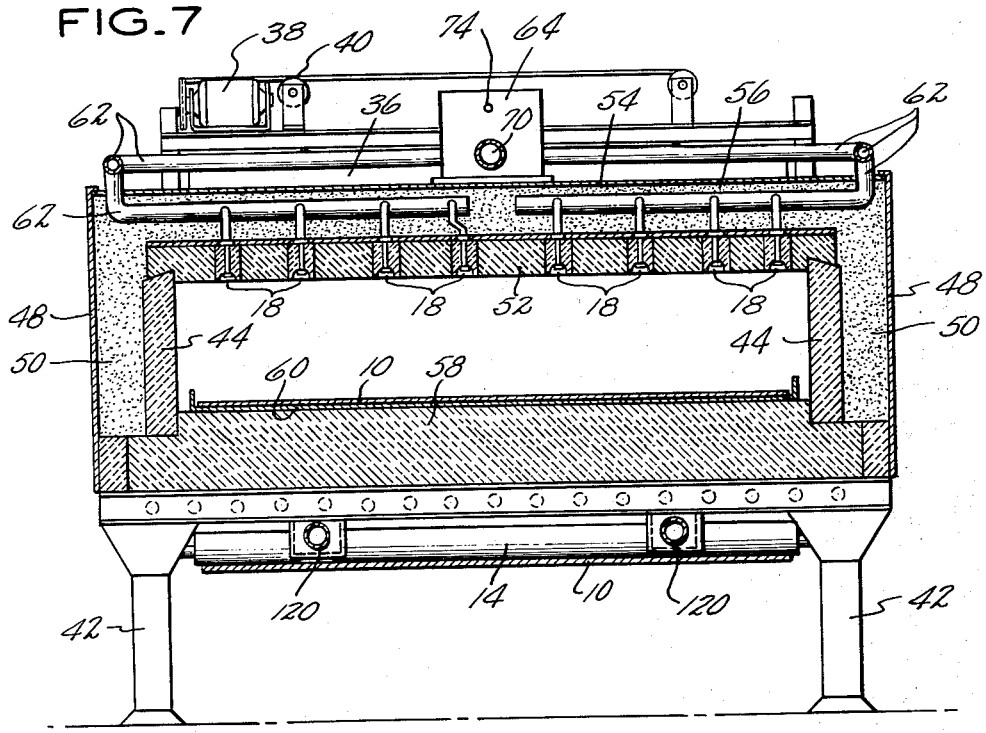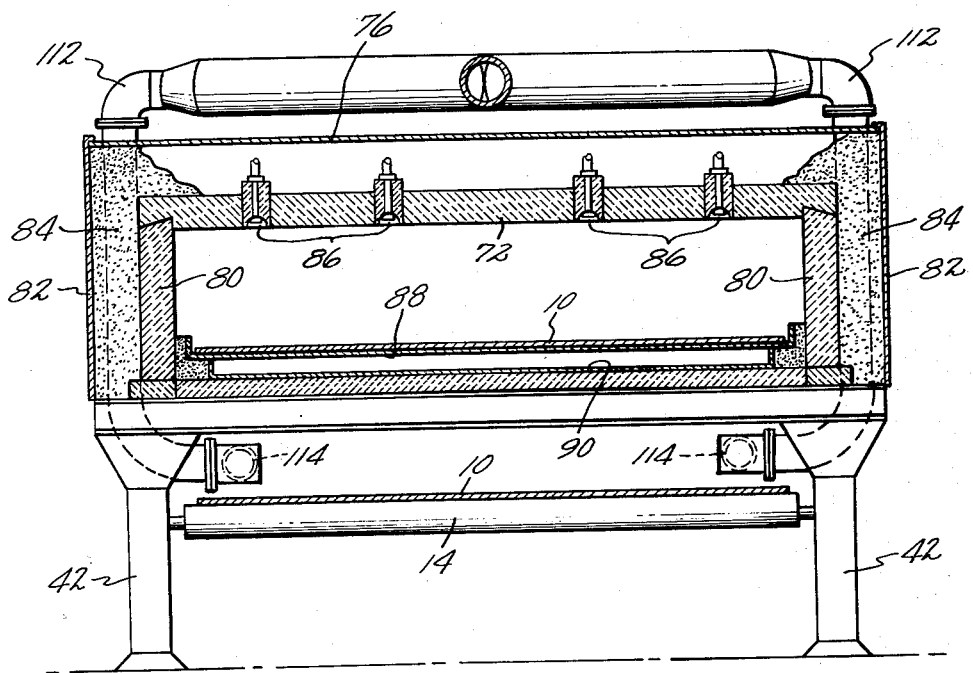

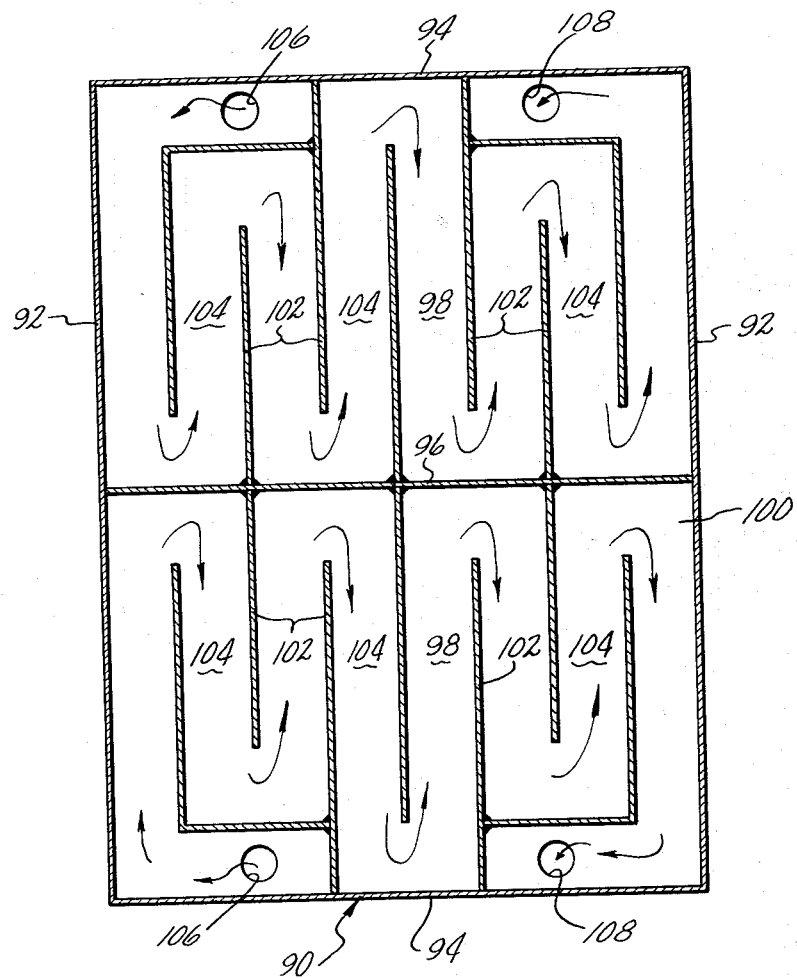

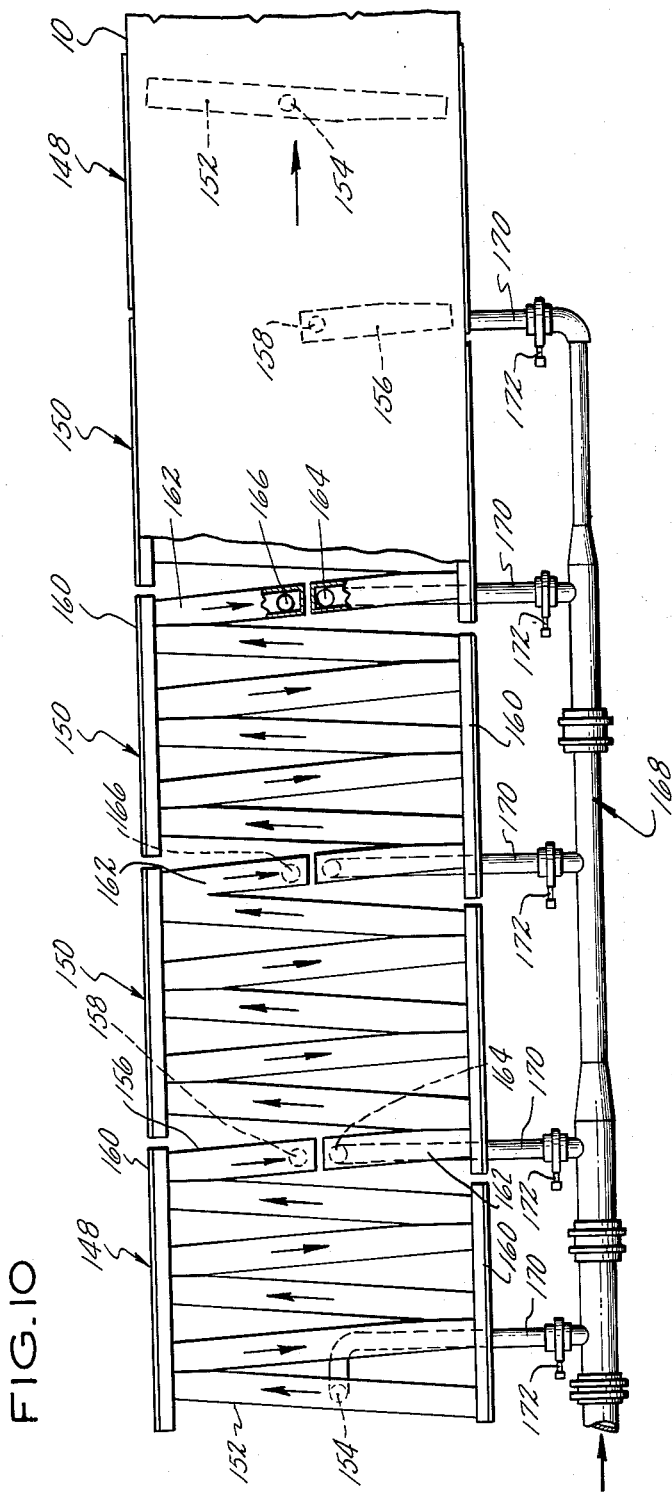

3,259,481
GLASSWARE ANNEALING LEHR
Robert A. Fuller and Francis E. Dorsey, West Hartford, and Constantine W. Kulig, Wethersfield, Conn., assignors to Emhart Corporation, Bloomfield, Conn., a corporation of Connecticut
Filed Feb. 28, 1963, Ser. No. 261,643
17 Claims. (Cl. 65—350)

This invention relates generally to the annealing of glassware and this application is a continuation-in-part of the application of Kulig et al. Serial No. 135,198, filed August 31, 1961, now abandoned.

Modern glass making machinery has become more productive and provides more glassware per unit of time than known lehrs using known methods of glassware annealing can handle. One solution to this problem would be to provide longer or larger lehrs, but this is not the answer because space requirements are limited. Further, space that was once available is now taken by automatic inspection apparatus and the like in glassware producing lines so that the space for lehr use is limited.

The answer provided in accordance with the present invention is to decrease the annealing time in a new method of glassware annealing so that a lehr capable of performing the improved method can be used in the available space and fully anneal the glassware and cool it to room temperature while keeping up with the high production requirements of modern glassware making machinery.

In keeping with the present invention there is provided an improved glassware annealing process which decreases the annealing time while nonetheless providing for heating of the glassware as required to completely release strain; cooling of the glassware without introduction of objectionable permanent strain; and further cooling of the ware without introduction of temporary strain that might produce breakage. In developing the method of this invention, it has been borne in mind that the rate of release of strain in glass is proportional to the amount of strain and inversely proportional to the viscosity of the glass. Further, the method of this invention has been developed with the understanding that if the object of the annealing is not to obtain glass of a maximum refractive index or density, as in the production of optical glass, but it is the object to obtain glass substantially free of strain, as in the manufacture of glass containers, the glass may be cooled more rapidly at the higher temperature end of the process so that any strains introduced will be rapidly relieved, and the glass can be cooled more slowly at the lower temperature end of the process to avoid permanent strain. This understanding or development in connection with the invention is in sharp contrast to the annealing theory developed by Adams and Williamson many years ago for annealing optical glass, the theory that is applied generally to the manufacture of other glass today.

Therefore, it can be said that it is the general object of the invention to provide an improved method of annealing glassware and an improved apparatus particularly well adapted to the practice of the method, both the method and apparatus exhibiting substantially higher degrees of efficiency than have heretofore been obtained.

It is a feature of the invention to provide an annealing method that departs substantially from conventional practice in the reduction of glassware temperature from its annealing point to its strain point, and which thereby provides a substantial increase in the overall rate of ware temperature reduction in this range.

Another feature of the invention resides in the provision of a glass annealing apparatus or lehr particularly adapted to carry out the method referred to in the preceding paragraph and which alternatively may be substantially reduced in length or substantially improved in respect to operating speed as compared with conventional lehrs.

A further feature of the invention resides in the provision of a glassware annealing method and a lehr wherein heating of the ware is accomplished in a particularly efficient manner whereby to effect further overall efficiency improvement.

Still another feature resides in the provision of a lehr of the type referred to wherein the conveyor is more forceably cooled than has heretofore been the case whereby to shorten the overall time for reduction of ware temperature to the strain point.

A still further specific feature of the invention resides in effecting a substantial improvement in the cooling range of the method and lehr in cooling below the strain point and thereby further enhancing overall efficiency.

The drawings show preferred embodiments of the invention and such embodiments will be described, but it will be understood that various changes may be made from the constructions disclosed and that the drawings and description are not to be construed as defining of limiting the scope of the invention, the claims forming a part of this specification being relied upon for that purpose.

Of the drawings:

FIG. 7 is a vertical transverse section taken generally as indicated at 7—7 in FIG. 3 with certain background parts omitted;

FIG. 8 is a vertical transverse section taken generally as indicated at 8—8 in FIG. 3 with certain background parts omitted;

FIG. 9 is a fragmentary horizontal section taken generally as indicated at 9—9 in FIG. 3;

FIG. 10 is a somewhat schematic plan view of an alternative embodiment of conveyor belt cooling apparatus usable in an annealing section of the lehr shown in FIGS. 3 and 4;

Method

As mentioned, the method of the present invention contemplates improvement in the heating of glassware. Heating constitutes a first step in any annealing method and may involve merely the heating accomplished during and remaining after forming. That is, glassware may enter a lehr from a forming apparatus at a sufficiently high temperature, at least approximately at the annealing point, and no addition of heat may be required in the lehr. In most instances, however, additional heating within the lehr is necessary and the present method contemplates in-lehr heating where necessary by high intensity radiation applied particularly to portions of the ware where its walls are the thinnest. Heat of course escapes more rapidly in these portions of glassware and the application of additional heat is most needed here. Upper portions of glassware ordinarily have thinner wall sections than lower portions thereof and accordingly heat is applied from above the ware by high intensity radiation in practicing the present method, the ware customarily being transported in an upright attitude on the lehr conveyor.

Figure 2:
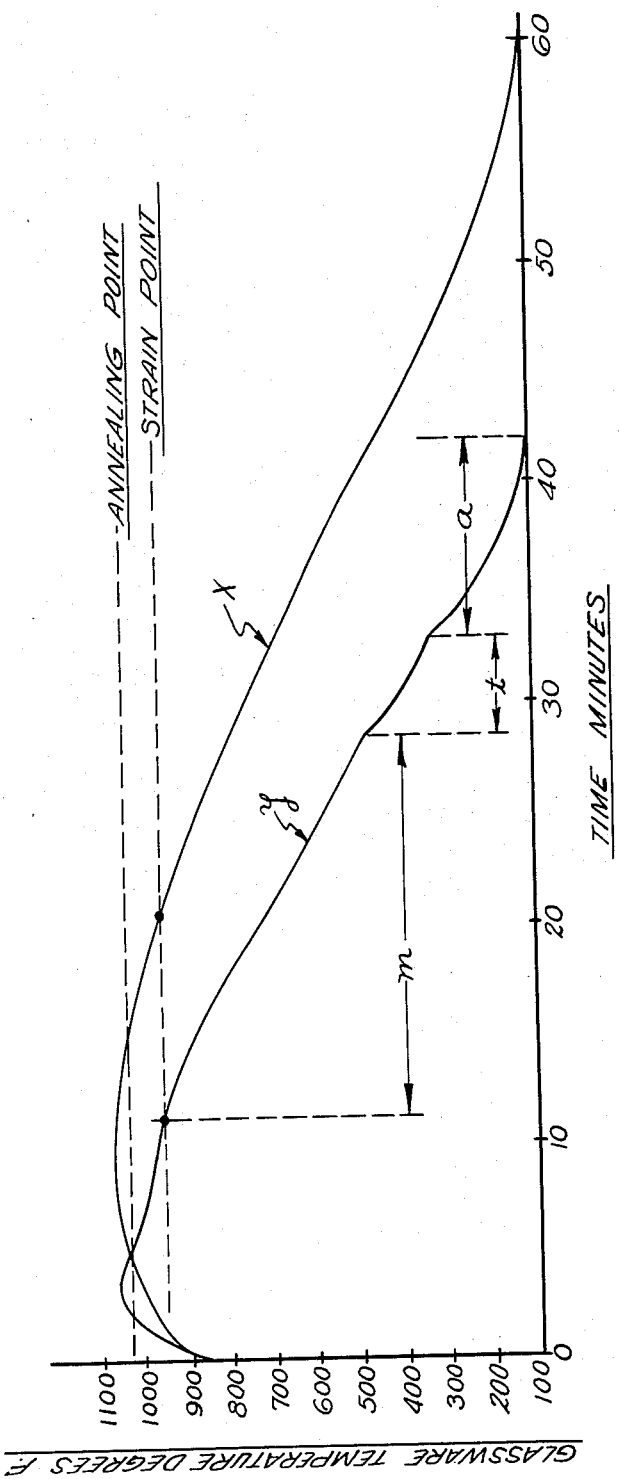
FIG. 2 is a graphical illustration and includes curves reflecting the method and lehr of the present invention and a method and lehr of known type.

Referring particularly to FIG. 2 and comparing curves $x$ and $y$ where $x$ represents an annealing method of a conventional lehr and $y$ represents the annealing method of the present invention, a substantial time saving will be apparent. In practice of the method of the present invention in annealing a particular type of ware, the glassware reached a temperature of approximately 1050° F. in about three minutes elapsed time whereas the same type ware requires approximately seven minutes to reach the same temperature under the conventional method. Generally similar improvement is to be anticipated in handling other types of ware. Observing that the glassware under consideration in FIG. 2 has an annealing point of approximately 1020° F. (defined as that temperature corresponding generally to the upper end of the annealing range), it will be seen that the ware in each case is actually heated above its annealing point (but not high enough to cause distortion) in preparation for a second step in the annealing method.

The second step in each annealing method involves the reduction of ware temperature through the "annealing range" or, more specifically, from its annealing point to its strain point (defined as that temperature from which the ware may be cooled rapidly without the introduction of objectionable permanent strain) and it is here that the present method departs most extensively from the conventional method and achieves a most impressive time economy. The conventional method of annealing involves a very slow reduction of ware temperature in the "annealing range" to approximately 950° F. in the present instance, and, moreover, the temperature reduction is carried out at an increasing rate of reduction as will be apparent from inspection of the curve $x$. In contradistinction, the method of the invention contemplates ware temperature reduction in the "annealing range" at a much higher overall rate of reduction and, more specifically, at a high initial rate of reduction and thereafter at a decreasing rate of reduction with the rate approaching zero as the ware approaches its strain point. Inspection of curve $y$ clearly shows the high initial rate of temperature reduction in the range three (3) to five (5) minutes and the gradually decreasing rate of temperature reduction in the range five (5) to eleven (11) minutes and, in addition, a time economy of approximately nine (9) minutes is to be noted between the points at which the curves $x$ and $y$ reach the 950° F. level.

Still with regard to the "annealing range" it is to be understood that the more rapid present method provides annealed glassware equal and even superior in quality to ware obtained with the conventional method. Glassware is capable of releasing strain readily and at a rapid rate at or near its annealing point and this ability diminishes as the ware approaches its strain point. Thus, the present method is in keeping with and well suited to the strain releasing characteristics of the ware. The initial high rate of temperature reduction takes advantage of the greater strain releasing capability of the ware in the higher temperature range and the comparatively low rate of temperature reduction at and near the strain point is particularly well adapted to the diminished strain releasing capabilities of the ware in this temperature range.

Referring now particularly to the cooling range or zone below the strain point a still further time economy is in evidence. Curve $x$, representing the conventional method, reflects a gradual and substantially constant rate temperature reduction throughout this range. On the other hand, the method of the present invention converts from one type of cooling to another when a first type of cooling loses effectiveness and this conversion results in a substantially higher over-all cooling rate. "Muffle cooling" is employed in a first portion $m$ of the cooling range or zone and may take the form of a conventional type of radiation cooling. As will be noted, the rate of ware temperature reduction gradually decreases in this portion of the cooling range and it may be said that the muffle cooling loses effectiveness as ware temperature is reduced. When the loss in effectiveness has reached a point (at approximately 500° in the example given), conversion to a second type of cooling is accomplished. The portion $t$ of the cooling range or zone is here referred to and the type of cooling employed may be characterized as "forced tempered air cooling." Forced tempered air cooling involves the use and application of heated air for direct flow over and in contact with the ware. As will be noted, the forced tempered air cooling initially effects ware temperature reduction at a higher rate than the terminal rate for muffle cooling. As forced tempered air cooling continues, however, the rate of ware temperature reduction decreases and cooling effectiveness is diminished. The portion $a$ of the cooling range or zone represents "forced room or atmospheric air cooling" and clearly shows the manner in which cooling effectiveness is enhanced. The room or atmospheric air cooling initially effects ware temperature reduction at a substantially higher rate than the terminal rate obtained with forced tempered air cooling. Thus, each type of cooling is employed in the temperature range to which it is best suited with the result of high over-all cooling efficiency.

Finally, inspection of the terminals of the curves $x$ and $y$ demonstrates an overall time economy in favor of the present method in the neighborhood of fifteen (15) minutes in a sixty (60) minute example. As will be apparent this reflects a substantial reduction in lehr length and bulk, a consideration of critical importance in the present art.

*Glassware annealing apparatus—General organization*

Figure 1:
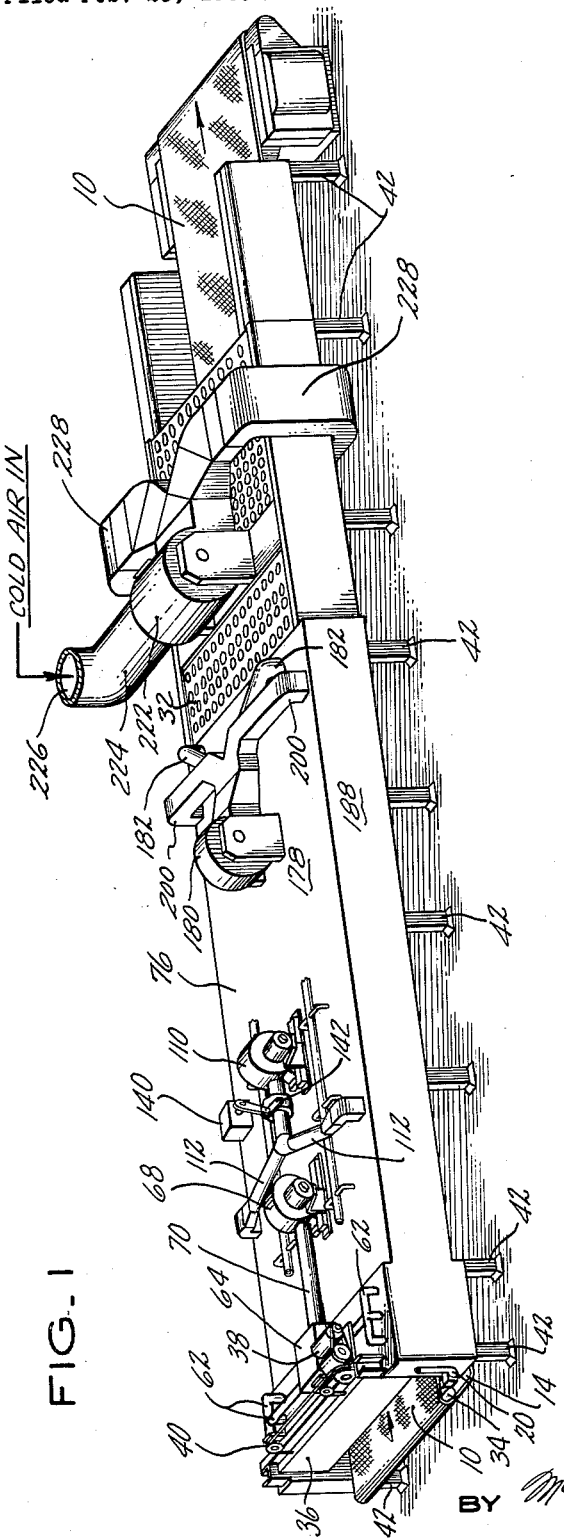
FIG. 1 is a somewhat schematic perspective view of a glassware annealing apparatus of lerr constructed in accordance with the present invention.

As illustrated in the schematic of FIG. 1 and the longitudinal sections of FIGS. 3 through 6 viewed in end-to-end sequence, a glassware annealing apparatus or lehr constructed in accordance with the present invention is of an elongated generally tubular configuration and includes a substantially flat horizontally extending conveyor such as 10. The conveyor 10 is adapted to support and to transport glassware through the lehr in an upright attitude. The ware may comprise a plurality of bottles such as 12 arranged generally in transversely extending rows and transported in succession through the various zones or sections in the lehr. The conveyor may vary widely in form, but as shown comprises a flexible metallic meshlike endless conveyor belt having an upper run disposed within the lehr and a lower or return run disposed beneath the lehr and supported by suitable rollers such as 14, 14. Suitable drive means for the belt 10 may be connected with a drive roll 16, FIG. 6, to provide for continuous movement of the glassware through the lehr on the upper run of the belt 10.

The bottle 12 represents ware at the inlet or front end of the lehr and which may be deposited from a forming machine for passage through the lehr on the belt 10 from left to right. In passage through the lehr the glassware first enters a heating zone or section A and is then transported in succession through an annealing zone or section B, a muffle cooling zone or section C, a forced tempered air cooling zone or section D and a forced room air cooling zone or section E. Finally, the ware is delivered to a platform section F from which it may be removed for further operations such as inspection.

Glassware may enter a lehr with sufficient heat content for annealing, but a zone is required in the lehr for equalizing the ware temperature and bringing it to the proper level for complete release of strain without distortion of the ware. In keeping with this, heating means in the zone or section A is provided, preferably in the form of a bank of high intensity radiation heating devices or elements 18, 18 adapted to heat the ware as it passes through the zone on the belt 10. Radiation heating has the property of heating the ware throughout its mass. Additionally, there is preferably provided a belt heating means such as the transverse rows of burners indicated at 20, 20 which heat the bottoms of the ware as well as the belt. Additional belt heating means may also be provided in a form to be described hereinbelow.

Whether conditioned by the addition of heat in the zone A or through heat retention alone, the glassware on leaving said zone is above its annealing point and is prepared for the rapid and efficient reduction of its temperature to the strain point in accordance with the method of the invention. Such temperature reduction occurs in the annealing zone B, and cooling of the belt 10 in said zone is used to remove heat from the belt and the bottom of the ware in order that the ware temperature reduction will be substantially uniform throughout its mass. More specifically, a conveyor belt cooling means is disposed beneath the belt 10 in the annealing zone B and serves to cool the belt in such manner that the ware thereon is cooled initially at a high rate of temperature reduction and thereafter at a decreasing rate of temperature reduction in passage through the zone. The belt cooling means may vary substantially in form and two embodiments thereof will be described fully hereinbelow.

The lehr is constructed at the annealing zone B, by greater insulation at the sides and lesser insulation at the top, so that the greater heat loss will occur at the top, further to maintain substantially uniform temperature throughout the cooling ware.

On leaving the annealing zone B, the glassware is at no more than its strain point, a comparatively high temperature which may, for example, be in the neighborhood of 950° F. for the glassware mentioned above. Below the strain point, the ware can be cooled rapidly without permanent strain, but too rapid cooling may introduce severe temporary strain and cause breakage. In keeping with this invention, muffle cooling is employed for temperature reduction in this range of cooling of zone C so that the glassware will dissipate its heat by radiation throughout its mass and avoid objectionable temporary strain. Cooling means for top and bottom walls 22 and 24 in the muffle cooling section C are provided and will be described fully hereinbelow.

As mentioned hereinbefore, the effectiveness of muffle cooling is reduced as the ware temperature is reduced and, in accordance with the method of the invention, prompt conversion to a second and more effective type of cooling is effected when this loss in efficiency reaches a certain point. As mentioned, tempered air cooling is employed and such cooling occurs in the zone or section D of the lehr. Direct contact of the tempered air with the ware is permitted in this zone or section and the air is permitted to escape from the lehr as by means of an open top or a perforate top wall 26. A perforate bottom wall or plate 28 is provided for the upward introduction and uniform distribution of tempered air, and a means is provided for utilizing exhaust muffle air and supplying it as the heated air under pressure beneath the plate 28. The heated air is at a temperature below the ware and a full description of the said means for supplying the air will be found hereinbelow.

As the temperature of the glassware is reduced in the zone D and as the effectiveness of the forced tempered air cooling is correspondingly reduced, a low level of effectiveness is reached and conversion to a more effective type of cooling becomes desirable. Such conversion occurs on entry of the ware into the forced room air cooling zone or section E. In this section a bottom wall or plate 30, perforate in form, is provided for the upward introduction and uniform distribution of the room air. An open top or a perforate top wall or plate 32 serves to exhaust the air from the lehr after it has passed over and cooled the ware.

Finally, as mentioned above, the ware reaches a room or handling temperature as it passes from the forced room air cooling section E and reaches the platform section F for delivery to an inspection operation or the like.

Heating section A

Referring now particularly to the heating section A, it will be observed that the conveyor belt 10 extends forwardly therefrom and is supported by a suitable roll 34. The forwardly extending portion of the conveyor belt can serve as a loading platform for glassware to be introduced to the heating section A and suitable means not shown may be provided for mechanically loading the ware on the platform. Preferably, and as shown, a vertically movable gate 36 is provided for opening and closing the entrance to the lehr. Suitable power operated means such as a motor 38 and a drive mechanism 40 may be provided for selectively lifting and lowering the gate.

Suitable frame members including upright legs 42, 42 support the section which includes inner and outer side walls 44 and 48 spaced transversely with insulation 50 therebetween. Inner and outer or lower and upper top walls 52 and 54 similarly bound insulation 56 and the inner wall 52 has mounted therein the aforementioned heating devices or elements 18, 18. At the bottom, a heavy wall member 58 supports a channel 60 which extends longitudinally in the section and which supports and guides the upper run of the conveyor belt 10.

The aforementioned heating devices or elements 18, 18 preferably comprise gas burners connected by suitable supply conduits 62, 62 with a mixer and control unit 64 mounted atop the heating section A. The mixer and control unit 64 may be of well known form and need not be described in detail. It is sufficient to note that the unit operates to properly mix gas and air and to regulate the mixture supplied to the burners 18, 18 responsive to a temperature sensitive element 66. Air under pressure may be supplied to the mixer and control unit 64 from a blower 68 mounted atop the annealing section B and a conduit 70 extending from the blower to the said unit. The temperature sensitive element 66 is disposed in an inner or lower top wall 72 in the annealing section B adjacent the entrance of said section and is adapted to signal the mixture and control unit 64 by a connection illustrated in broken line form at 74. In operation, the temperature sensitive element 66 and the mixer and control unit 64 cooperate to regulate the burners 18, 18 and to thereby control the addition of heat in the heating section A in such manner that glassware is heated to and, preferably, slightly above its annealing point.

Annealing section B

The annealing section B should be considered with reference to FIGS. 3, 4, 8 and 9. The aforementioned inner or lower top wall 72 in said section is spaced from an outer or upper top wall 76 with insulation 78 disposed therebetween at least throughout a portion of the section as shown. Similarly, inner and outer side walls 80 and 82 are spaced transversely and appropriate insulation 84 may be provided therebetween. Suitable frame means including legs 42, 42 support the annealing section B together with the aforementioned belt supporting rollers 14, 14 and the upper run of said belt is supported by a longitudinally extending channel member 88 which may be formed in separate end-to-end sections or may comprise merely a unitary continuation of the aforementioned channel member 60. Heating elements 86, 86 which may take the form of gas burners similar to the elements 18, 18 are disposed in the inner top wall 72 and can be employed to heat the glassware in this section when proper temperature conditions are not maintained.

The previously mentioned cooling means for the belt 10 in the annealing section may vary widely in form, but in all cases passageway means for cooling air are provided beneath the belt. The passageway means preferably provide for the transverse back and forth flow of cooling air beneath the belt and, as stated, the air flow is so directed and controlled as to cool the conveyor in such manner that the ware thereon is cooled initially at a high rate of temperature reduction and thereafter at a decreasing rate of temperature reduction in passing through the annealing section.

In the presently preferred embodiment of the invention, passageway means of the aforesaid type are provided in hollow frame means adapted to support the upper run of the conveyor belt 10 as it passes through the annealing section. Further, the said hollow frame means preferably include the channel member 88 and additional frame means constructed in sectional form with individual sections arranged in end-to-end relationship and extending longitudinally beneath the conveyor belt and the channel member. Such individual frame sections are indicated generally at 90, 90 in FIGS. 3 and 4 and a single section is illustrated in plan form in FIG. 9.

The detailed construction of the frame sections 90, 90 may of course vary but as shown in FIG. 9 each section takes a generally rectangular plan form with opposing end walls 92, 92 and short opposing side walls 94, 94. A central wall 96 divides the interior of the frame into two similar portions 98, 98 having a common bottom wall 100, and the channel member 88 serves to close the top of the entire section as shown in FIGS. 3 and 4.

Each of the portions 98, 98 of the frame section includes a plurality of upright baffle plates 102, 102 which define generally zigzag cooling air passageways 104, 104. Further, each of the sections 98 has an inlet opening 106 and an outlet opening 108 in communication with the passageways 104, 104. Thus, cooling air can be introduced to the inlet openings 106, 106 and will flow generally transversely back and forth beneath the channel member 88 whereby to cool the same and thereby to cool the conveyor belt 10. Air flowing through the passageways 104, 104 also proceeds in a generally longitudinal direction and the frame sections 90 are so arranged in the annealing section that the longitudinal movement of cooling air occurs in the direction of belt movement. That is, each frame section 90 is arranged with its inlet openings 106, 106 closest to the left-hand or front end of the lehr.

Figure 3:
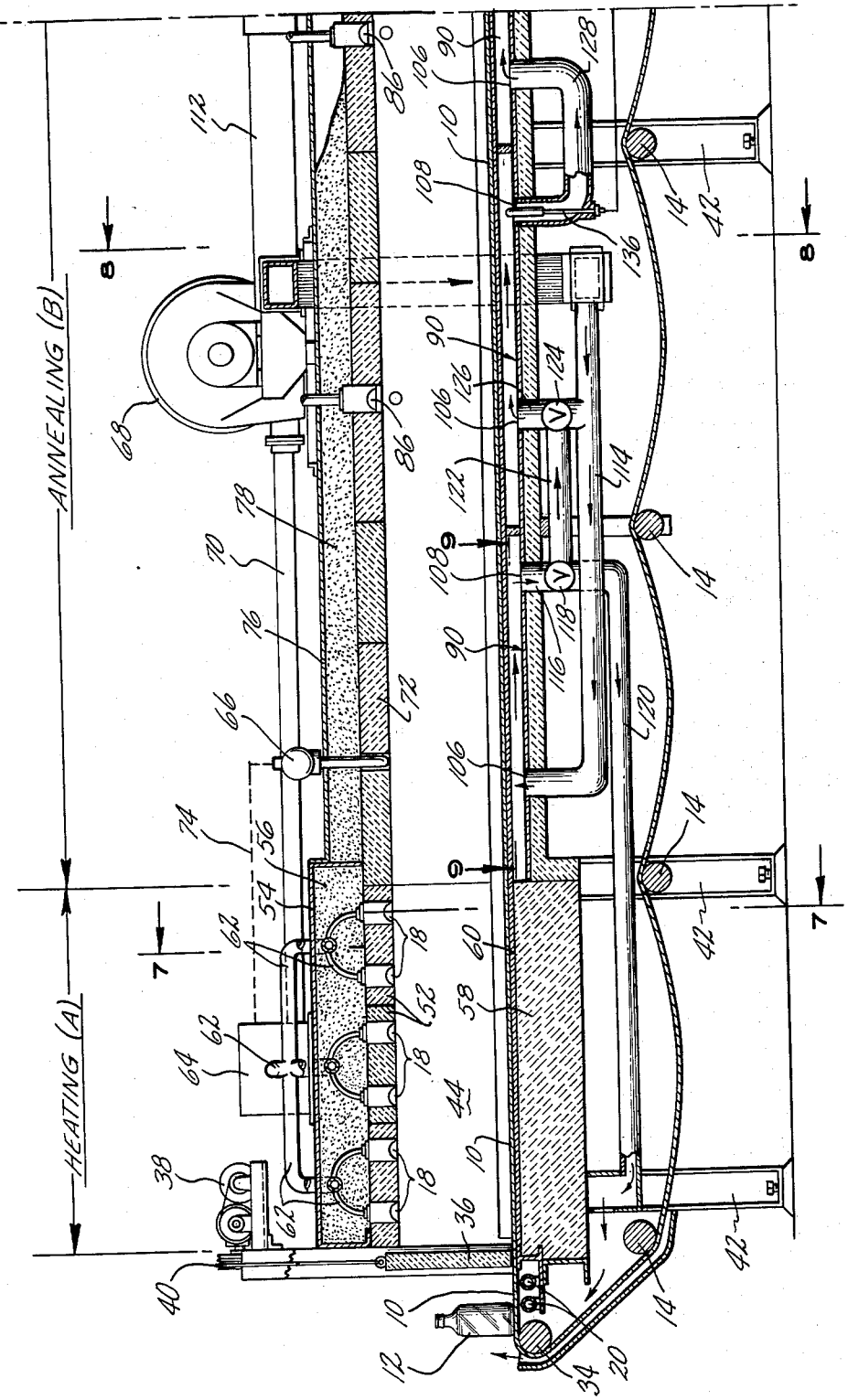
FIGS. 3, 4, 5 and 6 are vertical longitudinal sections of various parts of the lehr of FIG. 1 and are to be viewed in end-to-end sequence.
Figure 4:
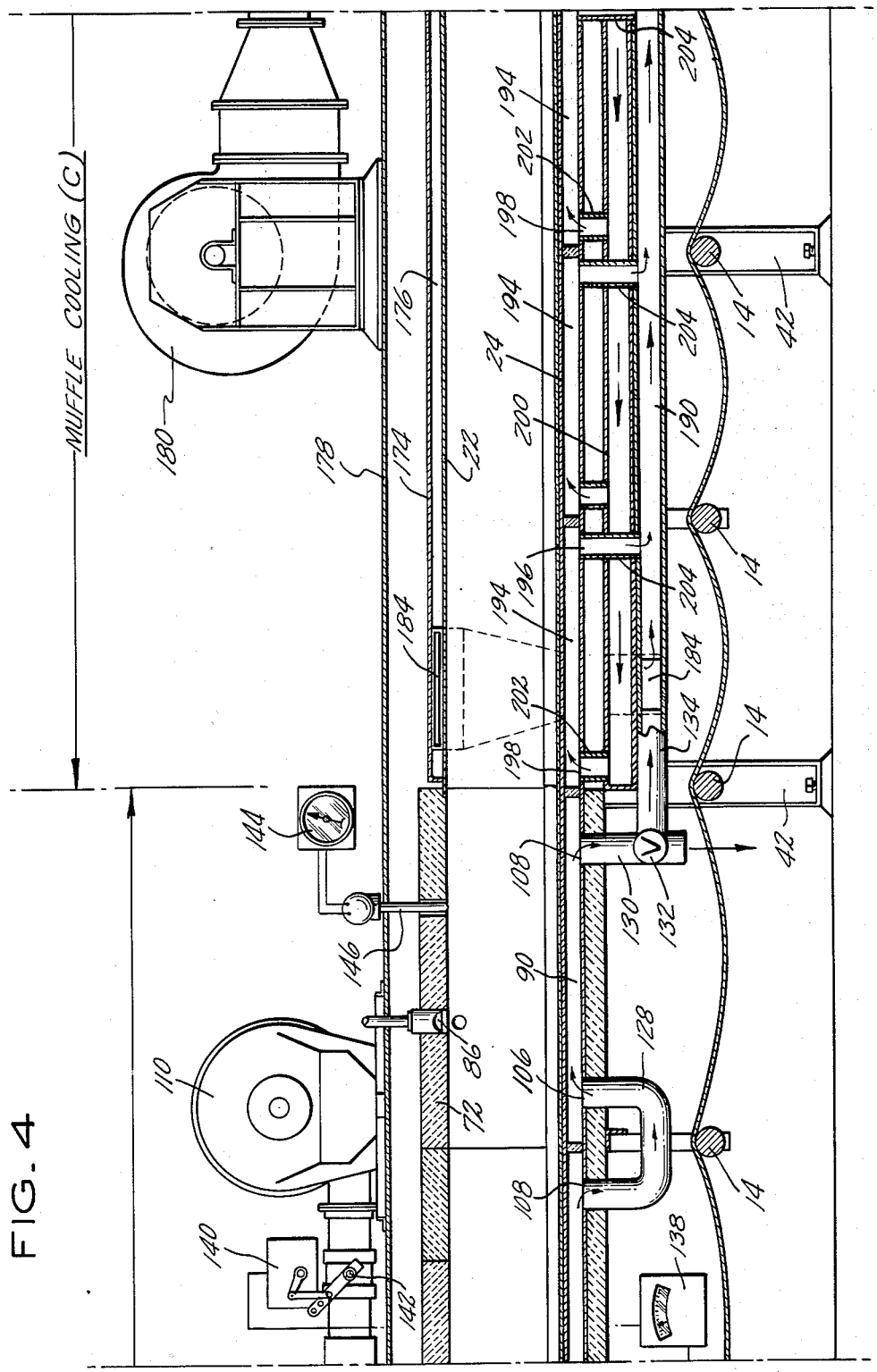

As illustrated in FIGS. 3 and 4, four hollow frame sections 90, 90 are provided in the annealing section B. Each of said sections is supplied with cooling air and, in accordance with the presently preferred practice, a blower 110 is provided atop the annealing section and supplies room or atmospheric air to the frame sections. Conduit means including dual main supply conduits 112, 112, FIG. 8, connect the blower with the said frame sections. The conduits 112, 112 extend to transversely spaced positions beneath the annealing section B and there connect with branch supply conduits 114, 114, one shown in FIG. 3. The branch supply conduits 114, 114 extend to the inlet openings 106, 106 of the first frame section 90 disposed at the left-hand end of the annealing section. Extending from the outlet openings 108, 108 of the first frame section 90 are conduits 116, 116, one shown, which connect with valves 118, 118, one shown. Also connected with the valves 118, 118 are belt preheating conduits 120, 120, one shown, and connecting conduits 122, 122, one shown. The belt preheating conduits 120, 120 extend toward the left-hand or front end of the lehr beneath the aforedescribed heating section A for the discharge of heated air upon the conveyor belt 10 and for the further preheating of the belt whereby to prevent ware breakage as mentioned above.

The connecting conduits 122, 122 extend to valves 124, 124, one shown, disposed in short branch conduits 126, 126 connected between the aforesaid branch supply conduits 114, 114 and the inlet openings 106, 106 of the second frame section 90. Each adjacent pair of outlet and inlet openings 108, 106 is connected by a conduit 128 and the final or right-hand outlet openings 108, 108 in the right-hand frame section 90 have extending therefrom conduits 130, 130, one shown. Conduits 130, 130, each open downwardly with a valve 132 disposed therein. Additionally, each of the valve 132, 132 has a conduit 134 connected therewith and extending rightwardly therefrom for a purpose to be described hereinbelow.

From the foregoing it will be apparent that the valves 118, 118 and 124, 124 can be adjusted to interconnect the conduits 116, 122 and 126 and to close the belt preheating conduits 120, 120. With this condition of the valves, cooling air flows from the blower 110 through the main supply conduits 112, 112, the branch supply conduits 114, 114 and to the first or left-hand frame section 90 through the inlet openings 106, 106. Thereafter, the cooling air flows in succession through the frame sections 90, 90 from left to right, passing first through the conduits 116, 116, 122, 122, 126, 126, and the second frame section 90 and thereafter through the succeeding frame sections 90, 90 and the connecting conduits 128, 128. The series connection of the hollow belt frames causes the cooling air to gradually increase in temperature as it is passed therethrough while the ware temperature decreases at a diminishing rate as it approaches the end of the annealing range.

With the valves 118, 118 adjusted to interconnect the conduits 116, 116 and 120, 120 and to disconnect the conduits 116, 116 from the conduits 122, 122 air warmed in passage through the first frame section 90 is delivered to the conduits 120, 120 and thence to the conveyor belt 10 for preheating the same. In this mode of operation, the valves 124, 124 are adjusted to disconnect the conduits 122, 122 and 126, 126 and to connect the conduits 126, 126 with the branch supply conduits 114, 114. Thus, cooling air from the branch supply conduits 114, 114 flows directly through the conduits 126, 126 to the second frame section 90 and thence through the connecting conduits 128, 128 and rightwardly in succession through the frame sections 90, 90.

In order that the cooling of ware in passage through the annealing section B may be regulated there is preferably provided a control means. The control means may vary widely in form but as shown, the condition of the ware is sensed indirectly by the provision of a temperature sensitive element 136 disposed in a connecting conduit 128 between the second and third frame sections 90, 90. The said element is connected with a controller and indicator 138 which in turn is connected with an actuator 140 for a valve 142 in the outlet conduit for the blower 110. The control elements may be of well-known form and it is sufficient to note that the elements 136, 138, 140 and 142 operate to regulate air flow and to maintain a selected temperature in the connecting conduit 128 whereby to maintain the desired cooling of the ware passing through the annealing section B.

An indicator is also provided as at 144 and is operatively connected with a temperature sensitive element 146 which may be disposed as shown in the right-hand portion of the annealing section B above the right-hand frame section 90.

Referring now particularly to FIG. 10, an alternative embodiment of a cooling means for a conveyor belt 10 will be described. It will be observed that the alternative hollow frame construction comprises a plurality of sections including identical end sections 148, 148 and similar intermediate sections 150, 150. Each end section 148 comprises a plurality of conduits which are preferably made of sheet metal of rectangular cross section and which extend generally transversely of the lehr below the belt 10. While the conduit sections extend transversely, they are nonetheless slightly inclined and they are closed at their ends. One conduit is inclined in one direction and the next adjacent conduit is inclined in the opposite direction so that the plurality of conduits in each section follow a zigzag or sawtooth pattern across the belt while the sections extend longitudinally of the lehr. The adjacent conduits, although they are closed at the ends, engage each other and there is an opening between their adjacent ends so as to in effect define one single sawtooth or zigzag conduit extending from end to end of either a section 148 or a section 150 of the frame. From the point of view of FIG. 10, the left-hand conduit or portion of the conduit in the left-hand end section 148, which conduit is identified by the reference numeral 152, has an inlet opening 154 therein. The right-hand conduit 156 does not extend fully across the lehr and terminates just short of the center line of the belt and is provided with a downwardly directed outlet opening 158. The openings 154 and 158 are similarly located in their respective conduits on the one and the opposite side of the center line of belt travel so that the end sections 148, 148 can be reversed when used respectively on the left and right-hand ends as shown in FIG. 10. The opening 154 in the section 148 on the left-hand end is an inlet opening while the opening 158 on the left-hand end section 148 is a discharge opening. The center line of travel for the belt extends longitudinally and approximately midway between the transverse distance separating the openings 154 and 158. The belt travel is defined by means of angle iron tracks 160, 160 which are welded over the transversely extending conduits along the longitudinal edges of the lehr.

The intermediate hollow frame sections 150, 150 are very similar to the end sections 148, 148 but similarly to the conduit length 156, the end conduits 162, 162 for each section do not extend the entire distance across the belt or from track 160 to track 160. In each case the end conduits 162, 162 terminate short of the belt travel center line and they are provided with a downwardly extending opening. The end of each conduit 162, 162 is closed as shown, and the inlet openings for the various intermediate belt frame sections are indicated by the reference numerals 164, 164. The outlet openings for the various sections are indicated by the reference numerals 166, 166.

In this alternative construction, an intake manifold 168 is employed and is connected with an air moving means such as the aforementioned blower 110 to introduce air to each of the hollow frame sections and to force it through the conduits thereof. Thus, a plurality of inlet conduits 170, 170 extend from the inlet manifold 168 to the inlet openings of each of the hollow frame sections. The outlet openings of the said sections direct the air discharged therefrom downwardly toward the floor upon which the lehr rests.

As will be observed, a valve means is provided for each of the inlet conduits 170, 170. Such valve means preferably takes the form of a gate valve 172 which can be operated to control the amount of air introduced to each hollow frame section, and one or more of the valves 172, 172 can be closed to cut off one or more of the hollow frame sections and thus to remove the cooling effect thereof. Obviously, the valve means can be operated manually or automatically responsive to temperature control devices if desired.

From the foregoing it will be apparent that the preferred construction of cooling means involves the series connection of a plurality of hollow frame sections for the flow of cooling air therethrough whereas the alternative construction involves a parallel connection of a plurality of frame sections. In either arrangement the cooling effect of the over-all arrangement on the belt is so regulated as to provide for cooling of the ware thereon initially at a high rate of temperature reduction and thereafter at a decreasing rate of temperature reduction in passage through the annealing section B.

*Muffle cooling section C*

Figure 5:
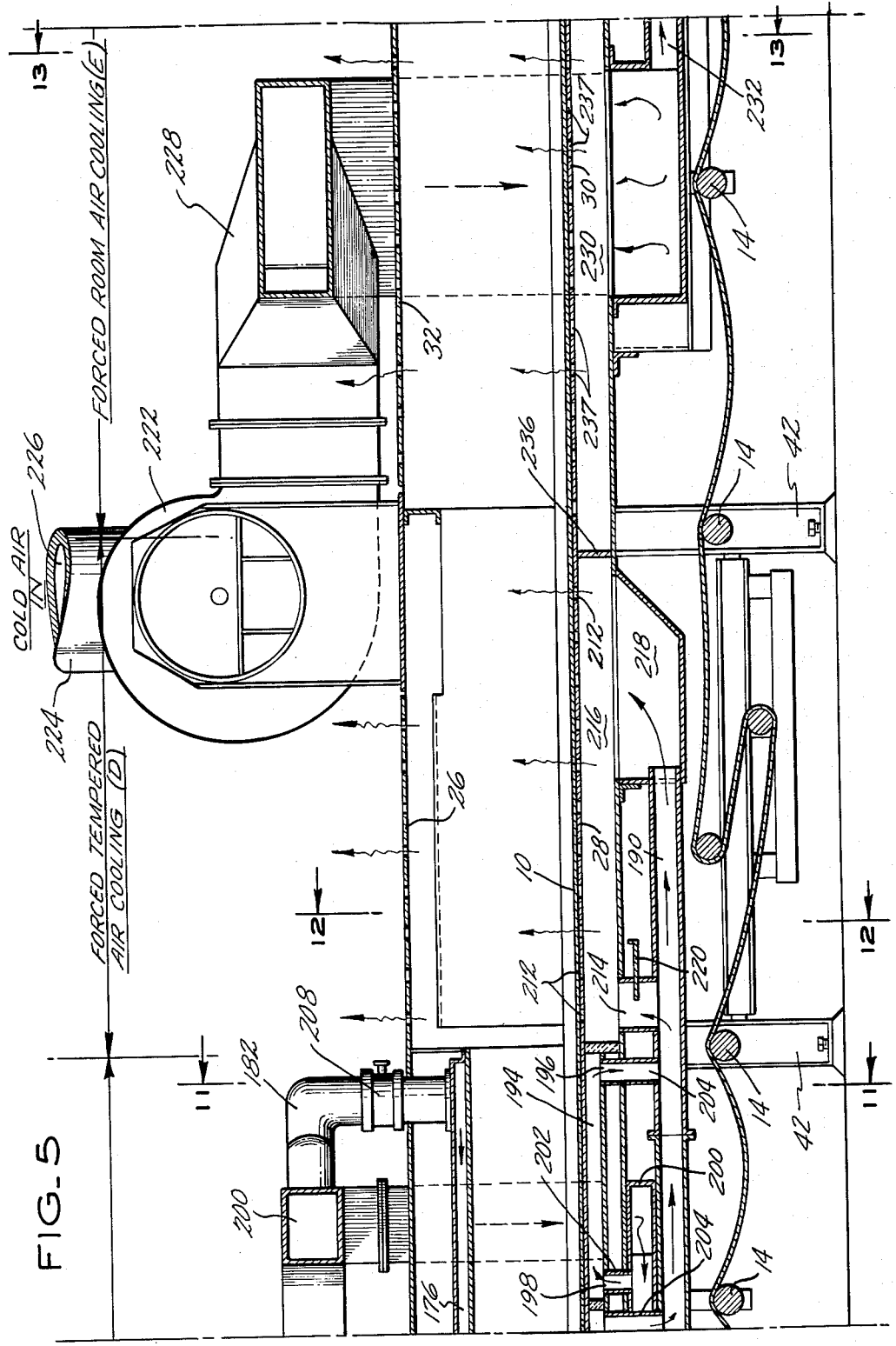
Figure 11:
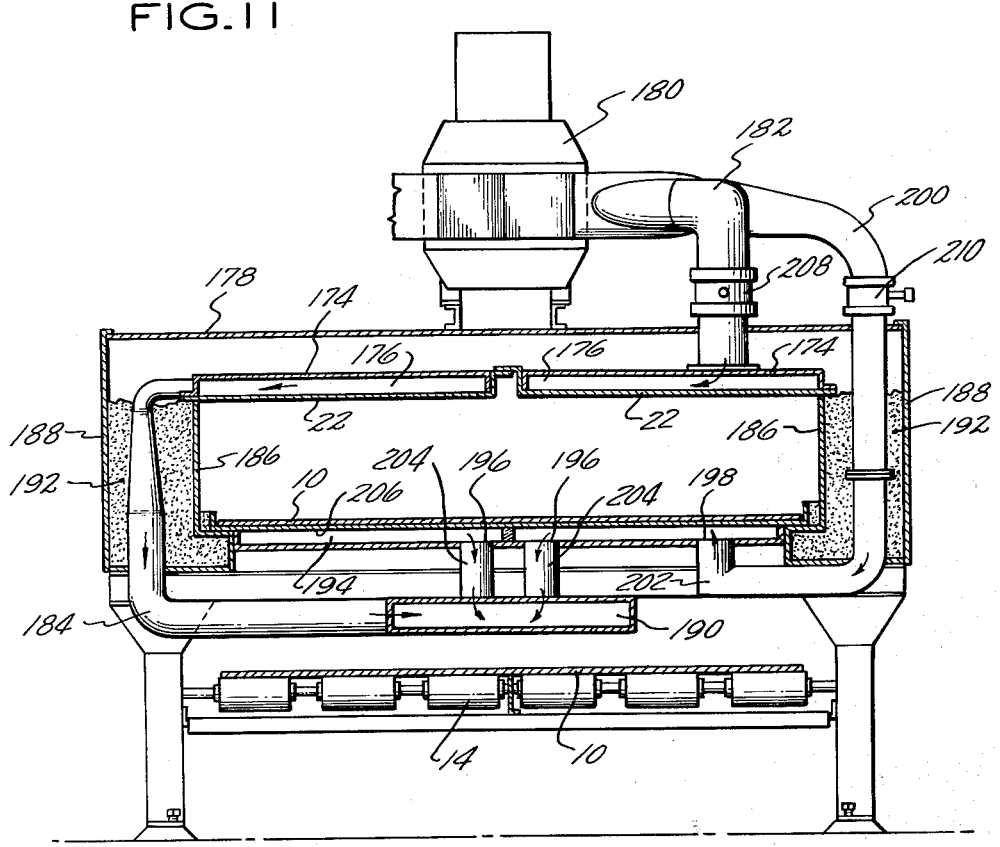
FIG. 11 is a vertical transverse section taken generally as indicated at 11—11 in FIG. 5 with certain background parts omitted.

The muffle cooling section C of the lehr of the present invention is best illustrated in FIGS. 4, 5 and 11. The aforementioned wall 22 comprises an inner top wall in the muffle cooling section and cooperates with an intermediate top wall 174 to define an elongated chamber 176 or, more specifically, a pair of elongated chambers 176, 176 as best shown in FIG. 11. An outer top wall 178 supports a blower 180 connected with first and second branch supply conduits 182, 182, one shown, for the chambers 176, 176. The conduits 182, 182 are connected respectively with the chambers 176, 176 adjacent the discharge or near end of the muffle cooling section and supply cooling air to the said chambers for the radiation cooling of ware passing beneath the wall 22. Adjacent the inlet end of the muffle cooling section each of the chambers 176 has connected thereto an exhaust conduit 184, one shown, and the said exhaust conduits extend downwardly between inner and outer side walls 186 and 188 for connection with a longitudinally extending exhaust manifold 190. Insulation 192 may be disposed between the inner and outer side walls 186 and 188 as shown.

Preferably, downward radiation cooling of the ware is also provided for in the muffle section and such cooling may be accomplished by hollow belt frame sections as in the annealing section B. As shown, four such sections 194, 194 are provided and are arranged in end-to-end longitudinally extending relationship. Each of the sections 194, 194 may be substantially identical with the sections 90, 90 described above except for the provision of outlet openings 196, 196 arranged near the longitudinal center line of the lehr as illustrated in FIG. 11. Inlet openings for each section 198, 198 may be arranged substantially as shown for the sections 90, 90 in FIG. 9 for a supply of cooling air from conduits 200, 200 one shown. The inlet conduits 200, 200 extend downwardly from the aforementioned blower 180 and thence longitudinally beneath the lehr with short branch supply conduits 202, 202 connected therewith. The outlet openings 196, 196 are connected with short branch exhaust conduits 204, 204 which in turn discharge to the aforesaid manifold 190. Additionally, the aforementioned conduits 134, 134 connect with the exhaust manifold 190 adjacent the inlet end of the muffle cooling section. Adjustment of the aforementioned valves 132, 132 may provide for exhaust of heating air from the right-hand frame section 90 selectively to atmosphere through the conduits 130, 130 or to the conduits 134, 134 and thence to the manifold conduit 190.

From the foregoing, it will be apparent that cooling air from the blower 180 can pass through the conduits 200, 200, the branch supply conduits 202, 202 and the inlet openings 198, 198 to the frame sections 194, 194 in the muffle cooling section C. The said sections are connected in parallel with respect to the conduits 200, 200 for a supply of cooling air thereto. The air passes through each section 194 in a back and forth traverse through baffles not shown but which may be similar to those in sections 90, 90 and is eventually exhausted through the conduits 204, 204 to the exhaust manifold 190. Thus, a channel belt support member 206 disposed above and closing the tops of sections 194, 194 is cooled to in turn cool the belt 10 and to cool the glassware thereon.

Control of the temperature within the muffle cooling section C may of course be effected through regulation of the air flow to the upper chambers 176, 176 and the frame sections 194, 194. Suitable valves 208, 208 and 210, 210 are shown disposed respectively in the conduits 182, 182 and 200, 200 for this purpose. Manual valve operation is indicated but automatic control may obviously be provided for.

Forced tempered air cooling section D

Figure 12:
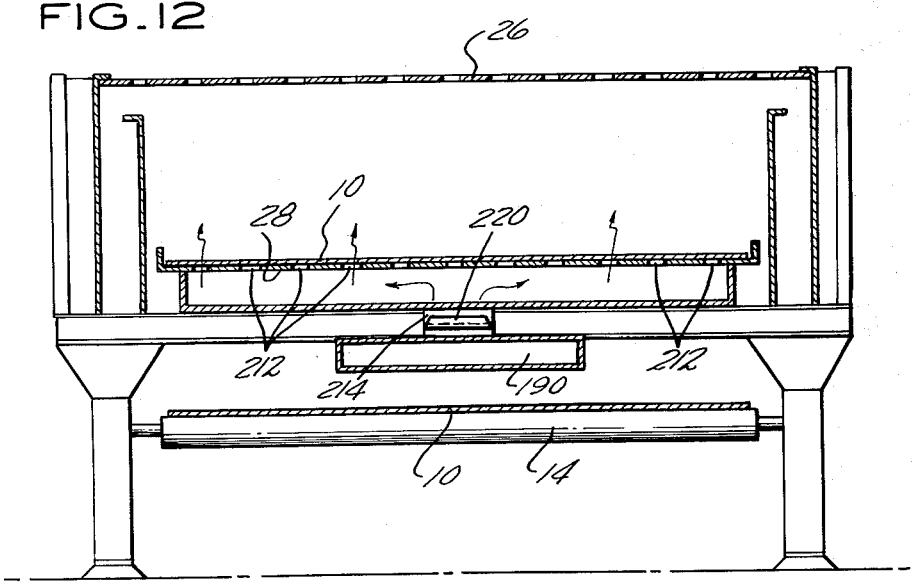
FIG. 12 is a vertical transverse section taken generally as indicated at 12—12 in FIG. 5 with certain background parts omitted.

Referring particularly to FIGS. 5 and 12, the forced tempered air cooling section D will be seen to comprise the aforementioned upper and lower plates or walls 26 and 28 which are perforate for upward air passage therethrough. The lower plate 28 comprises a channel as is best illustrated in FIG. 12 for support of the belt 10, the belt also being perforate and preferably of a metallic mesh construction as previously mentioned. Openings such as 212, 212 in the bottom plate 28 are spaced apart and are quite small and the plate is so constructed that the aggregate open area thereof is less than that of the supply duct. Thus, cooling air can be discharged upwardly through said openings and through the belt in discrete jets by providing such air under pressure beneath the plate, and highly effective cooling of the ware is thus achieved.

As mentioned previously, the cooling air employed in the forced tempered air cooling system comprises heated air which is yet at a temperature lower than that of the ware and capable of cooling the same. The exhaust manifold 190 referred to above extends beneath the forced tempered air cooling section D and connects with a first passageway 214 communicating with a chamber 216 and a second passageway 218 also in communication with said chamber. The chamber 216 lies immediately beneath the plate 28 for the discharge of air upwardly through the plate openings 212, 212. Preferable and as shown, the passageway 214 has disposed therein a valve member 220 whereby to regulate the distribution of air in the forward and rear portions of the chamber 216. Sufficient pressure is developed in the chamber 216 by the aforementioned blowers to provide for efficient jet discharge of air upwardly and over the ware on the belt 10. Moreover, the provision of a pressurized chamber beneath the plate 28 results in uniform distribution of the jets throughout the area of the plate. Still further, it is found that the jet discharge of air provides highly efficient cooling of the bottom portions of the ware whereas direct blanket discharge absent discrete jets as would be obtained through the mesh belt alone tends to cause stagnant zones of air beneath the individual articles of glassware with reduced cooling effect at the bottoms thereof.

Forced room air cooling section E

Figure 6:
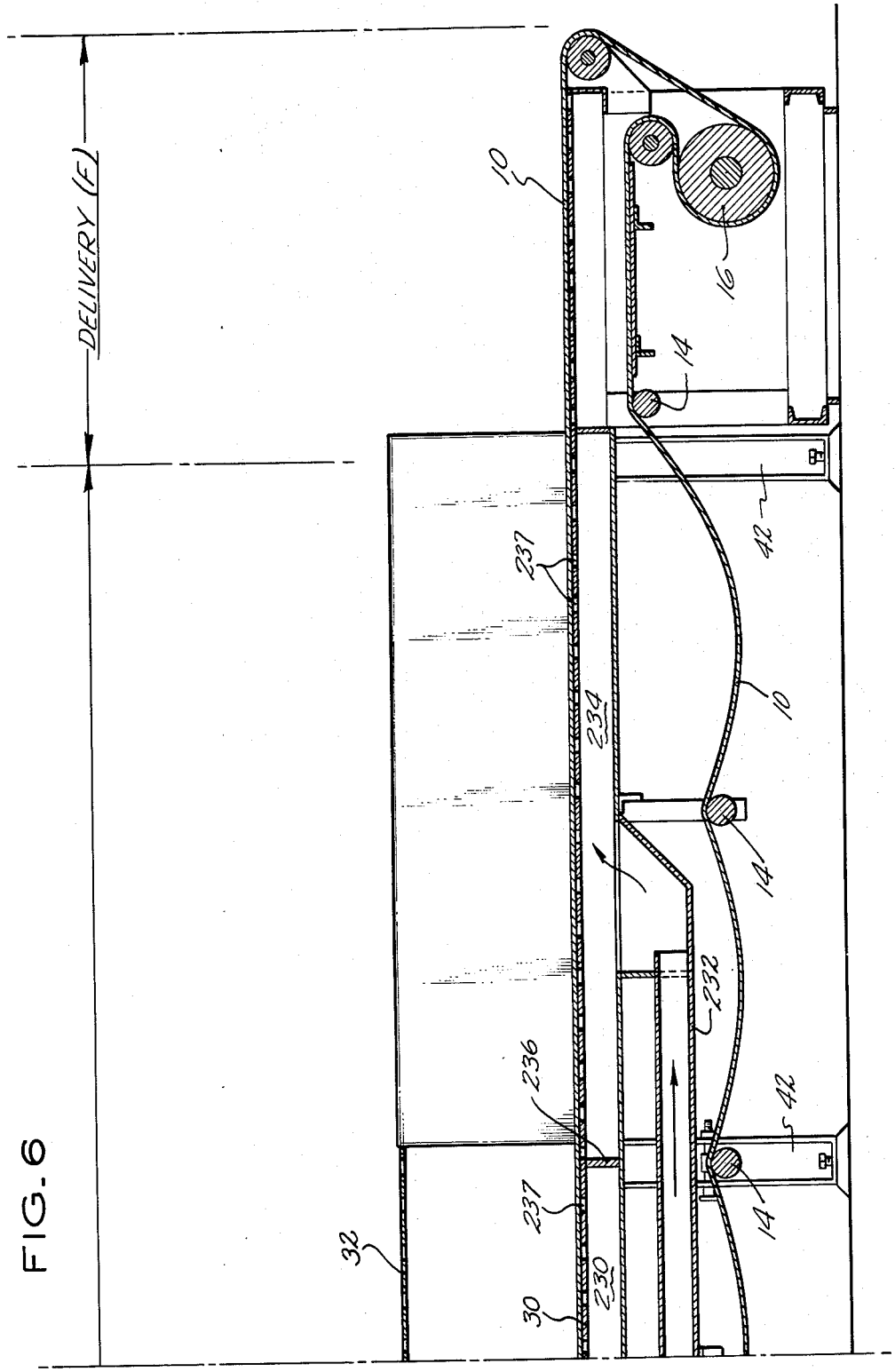
Figure 13:
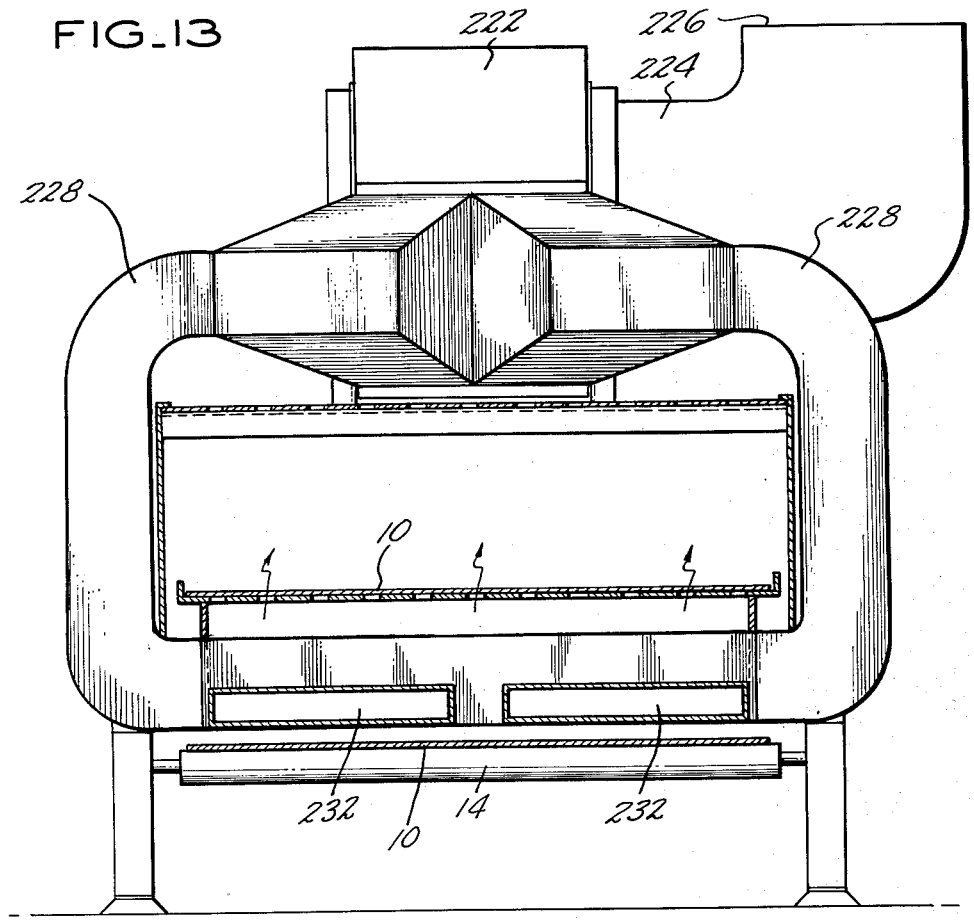
FIG. 13 is still another vertical transverse section taken generally as indicated at 13—13 in FIG. 5 with background parts omitted.

Referring particularly now to FIGS. 5, 6 and 13, it will be observed that a blower 222 is provided with an inlet duct 224 having an inlet opening 226 in spaced relationship with the top of the lehr. It is found that cooler air is obtained in this manner. The blower 222 connects with branch supply conduits 228, 228 best illustrated in FIG. 13 and these conduits in turn communicate with a chamber 230 and with parallel longitudinally extending supply manifolds 232, 232 beneath the lehr. The manifolds 232, 232 communicate rearwardly with a chamber 234 which may be separated from the chamber 230 as by a baffle 236. Disposed above both chambers 230 and 234 is the perforate channel member 30 mentioned previously. The channel member 30 supports the belt 10 and may be substantially identical with the member 28 described above, i.e., said member is provided with a plurality of spaced small openings 237, 237 for the upward discharge of discrete jets of cooling air. The aforementioned perforate top wall 32 extends approximately half way longitudinally of the forced room air cooling section E from the left-hand end and a right-hand portion of said section is open at the top as best shown in FIG. 1. Optionally, the top wall or plate 32 may be omitted.

From the foregoing, it will be apparent that discrete jet discharge of cooling air approximately at room temperature will occur upwardly through openings 237, 237 in the plate 30. Such discharge of cooling air occurs in substantially uniform distribution throughout the area of the member 30 due to the pressure built up therebeneath by the blower 222 and is well adapted to the efficient cooling of ware on the belt 10, as in the case of the plate 28 without loss of cooling effect upon the bottom portions of the ware.

Summary

From the foregoing it will be apparent that the lehr described is well suited to carrying out the method of the present invention. The portions of the ware which lose heat most rapidly are the thinner upper portions as mentioned. High intensity radiation heat from above in the heating section of the lehr results in rapid and efficient heating of such portions and provides for temperature equilibrium in the ware.

The portions of the glassware most difficult to cool are those in contact with the belt which are generally the heavier portions, and this is taken into account in the annealing section of the lehr wherein cooling is effected from below. Moreover, the cooling of the conveyor belt which is accomplished in this section is controlled to initially reduce ware temperature at a high rate of reduction and to thereafter decrease the rate of temperature reduction. This results in a reduction of time in handling glassware in the lehr until it reaches the strain point.

Muffle cooling is most efficient as a first type of cooling in avoiding severe temporary strain and in reducing ware temperature at the maximum rate permissible in the temperature range under consideration. Thus, muffle cooling is appropriately employed but when it loses effectiveness conversion to tempered air cooling is promptly effected. Tempered air cooling is highly effective in reducing temperature in the temperature range wherein it is employed, but when the rate of temperature reduction decreases substantially conversion is quickly effected to forced room air cooling. In the forced room air cooling section the reduction of glassware temperature is accomplished at a rapid rate and in a particularly effective manner with cooling of the bottom portions of the ware provided for in the aforesaid jet discharge of cooling air through the conveyor belt.

As a result of the substantial improvements in various portions of the lehr and particularly in the annealing section thereof, highly significant improvement in overall lehr efficiency is achieved. Referring again to the curve of FIG. 2 it will be observed that approximately 42 minutes are consumed in annealing glassware in the present lehr and in accordance with the present method. This is to be compared with a time period of approximately 60 minutes in a conventional lehr operated in accordance with the conventional method depicted in curve x of FIG. 2. With conveyor belt speeds equal, a 54 foot lehr of the present type is required for a particular annealing task whereas a 78 foot lehr of the older conventional type would be needed to properly anneal the same glassware. Thus, the time expended with the conventional lehr and method is approximately 30 percent greater than that involved with the lehr and method of the present invention and a similar relationship exists in a comparison of lehr length and bulk.

The invention claimed is:

1. In a glassware annealing lehr of the type which is of a horizontally elongated and generally tubular configuration wherein temperature zones are created for heating and annealing and then cooling glassware, the combination of a perforate substantially flat and horizontally extending conveyor for transporting the ware successively through the zones in an upright attitude, high intensity radiation heating means disposed above the path of ware movement in the heating zone, means for regulating said heating means whereby to heat ware passing therebeneath approximately to its annealing point, means disposed generally horizontally beneath the conveyor in the annealing zone and defining passageway means closed at the top and having an inlet and outlet opening for the flow of cooling air therethrough in the direction of belt movement, air moving means connected with one of said openings to move air from outside the lehr through said passageway means, said passageway means and openings being so arranged beneath said conveyor that the latter is cooled by said air so as to cool ware thereon initially at a high rate of temperature reduction and thereafter at a decreasing rate of temperature reduction in passage through said annealing zone, means in a first section of the cooling zone defining a top chamber and inner and outer top walls and a bottom chamber and inner and outer bottom walls, and air moving means connected with each of said chambers and effecting a flow of cooling air therethrough for the cooling by radiation of ware passing through said zone section.

2. The combination in a lehr as set forth in claim 1 wherein said cooling zone includes a second section adjacent the discharge end of said first section, said second section including a wall disposed beneath said conveyor belt and having a plurality of small openings, and said second section also including an air moving means operable to create a substantial air pressure beneath said bottom wall and to thereby cause air to be emitted upwardly through the openings in the wall in discrete jets throughout the area of the wall for cooling of the ware thereabove.

3. The combination in a lehr as set forth in claim 2 wherein said second cooling section includes first and second portions arranged in the direction of ware movement, said first portion including conduit means connected with a discharge zone in at least one of said chambers in said first cooling section for a supply of heated air and having an outlet end arranged to discharge such air upwardly through said wall openings in discrete jets, and said second portion of said section being adapted for the supply of room air to the wall openings therein.

4. In a glassware annealing lehr of the type which is of a horizontally elongated and generally tubular configuration wherein temperature zones are created for heating and annealing and then cooling glassware, the combination of a perforate substantially flat and horizontally extending conveyor for transporting the ware successively through the zones in an upright attitude, high intensity radiation heating means disposed above the path of ware movement in the heating zone, means for regulating said heating means whereby to heat ware passing therebeneath approximately to its annealing point, hollow belt frame means disposed generally horizontally beneath and supporting the conveyor belt in the annealing zone and defining passageway means closed at the top and having inlet and outlet openings for the flow of cooling air therethrough, said inlet and outlet openings being spaced longitudinally for the flow of air therebetween in said passageway means generally in the direction of conveyor belt movement, and air moving means connected with said inlet opening to move air from outside the lehr through said passageway means, and said passageway means being so arranged beneath said conveyor that air flows generally transversely back and forth with respect to said conveyor belt whereby to cool the belt and to thereby cool the ware thereon in passage through said annealing zone initially at a high rate of temperature reduction and thereafter at a decreasing rate of temperature reduction.

5. In a glassware annealing lehr of the type which is of a horizontally elongated and generally tubular configuration wherein temperature zones are created for heating and annealing and then cooling glassware, the combination of a perforate substantially flat and horizontally extending conveyor belt for transporting the ware successively through the zones in an upright attitude, high intensity radiation heating means disposed above the path of ware movement in the heating zone, means for regulating said heating means whereby to heat ware passing therebeneath approximately to its annealing point, hollow frame means disposed generally horizontally beneath and supporting the conveyor belt in the annealing zone, said frame means comprising a plurality of similar sections each having inlet and outlet openings and passageway means therebetween closed at the top and adapted to direct air generally transversely back and forth with respect to the conveyor belt and longitudinally with respect to the movement thereof, said sections being arranged in longitudinal end-to-end relationship with the outlet opening of one section adjacent the inlet opening of the succeeding section, conduit means connected with said inlet and outlet openings for the supply of cooling air to each inlet opening and the discharge of air from each outlet opening, said inlet and outlet openings being spaced longitudinally for the flow of air therebetween in said passageway means generally in the direction of conveyor belt movement, and air moving means connected with said conduit means to supply atmospheric air thereto and to thereby provide cooling air in said passageway means to cool the conveyor belt and to cool ware thereon in passage through said annealing zone initially at a high rate of temperature reduction and thereafter at a decreasing rate of temperature reduction.

6. The combination in a lehr as set forth in claim 5 wherein said conduit means comprises a manifold connected with the air moving means and with the inlet opening of each belt frame section, and wherein valve means is provided to control air flow from the manifold to each of said sections.

7. The combination in a lehr as set forth in claim 5 wherein said conduit means includes an air supply passageway connected between said air moving means and the inlet opening of the frame section closest to the heating zone, and wherein said conduit means also includes connecting conduits extending between adjacent inlet and outlet openings in adjacent frame sections.

8. The combination in a lehr as set forth in claim 5 and including a conveyor belt preheating conduit having an outlet end arranged to discharge heated air onto said belt prior to entry of the latter into said heating zone, the inlet end of said preheating conduit being connected with the outlet opening of one of said frame sections.

9. In a glassware annealing lehr of the type which is of a horizontally elongated and generally tubular configuration wherein temperature zones are created for heating and annealing and then cooling glassware, the combination of a perforate substantially flat and horizontally extending conveyor belt for transporting the ware successively through the zones in an upright attitude, hollow means disposed generally horizontally beneath the conveyor in the annealing zone of the lehr and defining passageway means closed at the top and having an inlet and outlet opening for the flow of cooling air therethrough, said inlet and outlet openings being spaced longitudinally for the flow of air therebetween in said passageway means generally in the direction of conveyor belt movement, and air moving means connected with one of said openings to move air from outside the lehr through said passageway means, said passageway means and openings being so arranged beneath said conveyor that the latter is cooled by said air and the ware thereon is cooled initially at a high rate of temperature reduction and thereafter at a decreasing rate of temperature reduction in passage through said annealing zone.

10. The combination in a lehr as set forth in claim 9 wherein said hollow means comprises a frame adapted to support the conveyor belt, and wherein said passageway means provides for the generally transverse and back and forth flow of air with respect to the conveyor belt as well as the generally longitudinal flow in the direction of conveyor belt movement.

11. In a glassware annealing lehr of the type which is of a horizontally elongated and generally tubular configuration wherein temperature zones are created for heating and annealing and then cooling glassware, the combination of a perforate substantially flat and horizontally extending conveyor belt for transporting the ware successively through the zones in an upright attitude, hollow frame means disposed generally horizontally beneath and supporting the conveyor belt in the annealing zone, said frame means comprising a plurality of similar sections each having inlet and outlet openings and passageway means therebetween closed at the top and adapted to direct air generally transversely back and forth with respect to the conveyor belt and generally longitudinally therewith in the direction of movement thereof, said sections being arranged in longitudinal end to end relationship with the outlet opening of one section adjacent the inlet opening of the succeeding section, conduit means connected with said inlet and outlet openings for the supply of cooling air to each inlet opening and the discharge of air from each outlet opening, and air moving means connected with said conduit means to supply atmospheric air thereto and to thereby provide cooling air in said passageway means to cool the conveyor belt and to cool ware thereon initially at a high rate of temperature reduction and thereafter at a decreasing rate of temperature reduction in passage through said annealing zone.

12. The combination in a lehr as set forth in claim 11 wherein said conduit means includes an air supply passageway connected between said air moving means and the inlet opening of the frame section closest to the heating zone, and wherein said conduit means also includes air passageway means between each pair of adjacent inlet and outlet openings in adjacent frame sections.

13. The combination in a lehr as set forth in claim 11 and including a conveyor belt preheating conduit having an outlet end arranged to discharge heated air onto said belt prior to entry of the latter into said heating zone, the inlet end of said preheating conduit being connected with the outlet opening of one of said frame sections.

14. In a glassware annealing lehr of the type which is of elongated generally tubular configuration wherein temperature zones are created for heating and annealing and then cooling glassware and which includes a driven endless conveyor belt for transporting the ware through the various zones, the combination of a hollow frame which is disposed generally horizontally to support the belt from below, the said hollow frame comprising a conduit of generally rectangular cross section closed at the top and which extends in sawtooth fashion longitudinally of the lehr so as to provide for the flow of air therein across the belt and longitudinally therewith, and the said conduit having an inlet opening and an outlet opening, respectively, at its ends, and air moving means connected with one of said openings to move air from outside said lehr through the conduit to cool the belt in its travel through the lehr.

15. In a glassware annealing lehr of the type which is of elongated generally tubular configuration wherein temperature zones are created for heating and annealing and then cooling glassware and which includes a driven endless conveyor belt for transporting the ware through the various zones, the combination of a hollow frame which is disposed generally horizontally to support the belt from below, the said hollow frame including a plurality of similar sections each of which comprises a conduit of generally rectangular cross section closed at the top and which extends in sawtooth fashion longitudinally of the lehr so as to provide for the flow of air therein across the belt and longitudinally therewith, and each of which sections has an inlet opening and outlet opening, respectively, adjacent its ends, the said sections being adapted for arrangement in a continuous pattern with the inlet end of one section disposed adjacent to the outlet end of an adjacent section, a manifold connected to similar ends of the plurality of sections, and air moving means connected with said manifold to move air from outside the lehr through the various sections to cool the belt in its travel thereover.

16. The combination in a lehr as set forth in claim 15 wherein the manifold is connected with the inlet openings of the various sections.

17. The combination in a lehr as set forth in claim 15 wherein the manifold is connected with the inlet openings of the various sections and wherein valve means is provided to control flow from the manifold to each of the said sections.

References Cited by the Examiner
UNITED STATES PATENTS

| | | | |
|---|---|---|---|
| 1,585,542 | 5/1926 | Henry | 65—117 |
| 1,753,828 | 4/1930 | Greer at al. | 165—86 X |
| 2,268,609 | 1/1942 | Merrill | 65—351 |
| 2,280,306 | 4/1942 | Black | 65—119 X |
| 2,335,128 | 11/1943 | Merrill | 65—350 |
| 2,544,947 | 3/1951 | Baker | 65—119 |

DONALL H. SYLVESTER, *Primary Examiner.*

A. D. KELLOGG, *Assistant Examiner.*